US008881009B2

(12) United States Patent
Huang et al.

(10) Patent No.: US 8,881,009 B2
(45) Date of Patent: *Nov. 4, 2014

(54) SYNTHETIC AUDIOVISUAL DESCRIPTION SCHEME, METHOD AND SYSTEM FOR MPEG-7

(75) Inventors: Qian Huang, Ocean, NJ (US); Joern Ostermann, Morganville, NJ (US); Atul Puri, Riverdale, NY (US); Raj Kumar Rajendran, New York, NY (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 781 days.

This patent is subject to a terminal disclaimer.

(21) Appl. No.: 12/648,988

(22) Filed: Dec. 29, 2009

(65) Prior Publication Data

US 2010/0106722 A1    Apr. 29, 2010

Related U.S. Application Data

(63) Continuation of application No. 10/609,737, filed on Jun. 30, 2003, now abandoned, which is a continuation of application No. 09/495,171, filed on Feb. 1, 2000, now Pat. No. 6,593,936.

(60) Provisional application No. 60/118,023, filed on Feb. 1, 1999.

(51) Int. Cl.
*H04N 1/00*        (2006.01)
*G06F 17/30*       (2006.01)

(52) U.S. Cl.
CPC ...... *G06F 17/30858* (2013.01); *H04N 1/00209* (2013.01)
USPC .......................................... 715/717; 345/473

(58) Field of Classification Search
CPC .. H04N 1/00209; H04N 1/0035; G06F 3/048; G06T 15/00
USPC .......... 715/717, 719–726, 760; 345/619, 419, 345/473–475; 382/107
See application file for complete search history.

(56) References Cited

U.S. PATENT DOCUMENTS 5,657,426 A * 8/1997 Waters et al. ................. 704/276
5,983,218 A   11/1999 Syeda-Mahmood (Continued)

FOREIGN PATENT DOCUMENTS

EP          923195 A1    6/1999

OTHER PUBLICATIONS

International Organisation for Standardisation, Coding of Moving Pictures and Audio, Jul. 1997, Stockholm.

*Primary Examiner* — Steven Sax

(57) ABSTRACT

A method and system for description of synthetic audiovisual content makes it easier for humans, software components or devices to identify, manage, categorize, search, browse and retrieve such content. For instance, a user may wish to search for specific synthetic audiovisual objects in digital libraries, Internet web sites or broadcast media; such a search is enabled by the invention. Key characteristics of synthetic audiovisual content itself such as the underlying 2d or 3d models and parameters for animation of these models are used to describe it. More precisely, to represent features of synthetic audiovisual content, depending on the description scheme to be used, a number of descriptors are selected and assigned values. The description scheme instantiated with descriptor values is used to generate the description, which is then stored for actual use during query/search. Typically, a user, to search for a needed synthetic audiovisual content initiates a query that is passed on to a search engine that then retrieves the candidate content from one or more databases whose description closely matches the query criteria specified by the user.

30 Claims, 9 Drawing Sheets

(56) References Cited

U.S. PATENT DOCUMENTS

| | | | |
|---|---|---|---|
| 6,070,167 A * | 5/2000 | Qian et al. ............................ 1/1 |
| 6,073,122 A * | 6/2000 | Wool .............................. 705/51 |
| 6,249,546 B1 * | 6/2001 | Bist ........................ 375/240.03 |
| 6,275,236 B1 | 8/2001 | Delahunty |
| 6,463,444 B1 * | 10/2002 | Jain et al. ............................. 1/1 |
| 6,473,794 B1 * | 10/2002 | Guheen et al. ................ 709/223 |
| 6,490,370 B1 * | 12/2002 | Krasinski et al. ............. 382/195 |
| 6,493,758 B1 * | 12/2002 | McLain ........................ 709/227 |
| 6,496,606 B1 * | 12/2002 | Boutroux et al. ............. 382/276 |
| 6,587,574 B1 * | 7/2003 | Jeannin ........................ 382/107 |
| 6,593,936 B1 | 7/2003 | Huang et al. |
| 6,602,299 B1 | 8/2003 | Basso et al. |
| 6,654,931 B1 | 11/2003 | Haskell et al. |
| 6,813,776 B2 * | 11/2004 | Chernock et al. ............... 725/58 |
| 6,877,134 B1 * | 4/2005 | Fuller et al. .................... 715/202 |
| 6,996,171 B1 | 2/2006 | Walker et al. |
| 6,999,069 B1 | 2/2006 | Watanabe et al. |
| 7,082,407 B1 * | 7/2006 | Bezos et al. ................. 705/26.7 |
| 7,143,434 B1 * | 11/2006 | Paek et al. ..................... 725/142 |
| 7,254,285 B1 * | 8/2007 | Paek et al. ..................... 382/305 |
| 7,536,706 B1 * | 5/2009 | Sezan et al. ................. 725/113 |
| 2005/0220339 A1 | 10/2005 | Kim |

* cited by examiner

US 8,881,009 B2

SYNTHETIC AUDIOVISUAL DESCRIPTION SCHEME, METHOD AND SYSTEM FOR MPEG-7

The present application is a continuation of U.S. patent application Ser. No. 10/609,737, filed Jun. 30, 2003, which is a continuation of Ser. No. 09/495,171, filed Feb. 1, 2000, now U.S. Pat. No. 6,593,936, which claims the benefit of U.S. Provisional Application No. 60/118,023, filed Feb. 1, 1999, the contents of which are incorporated herein by reference in their entirety.

This application includes an Appendix containing computer code that performs content description in accordance with the exemplary embodiment of the present invention. That Appendix of the disclosure of this patent document contains material that is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

BACKGROUND OF THE INVENTION

1. Field of Invention

The present invention generally relates to audiovisual data processing. More particularly, this invention relates to the description of synthetic audiovisual content to allow such content to be searched or browsed with ease in digital libraries, Internet web sites and broadcast media.

2. Description of Related Art

More and more audiovisual information is becoming available from many sources around the world. Various forms of media, such as still pictures, video, graphics, 3D models, audio and speech, may represent such information. In general, audiovisual information plays an important role in our society, be it recorded in such media as film or magnetic tape or originating, in real time, from some audio or visual sensors, be it analogue or, increasingly, digital. While audio and visual information used to be consumed directly by the human being, computational systems are increasingly creating, exchanging, retrieving and re-processing this audiovisual information. Such is the case for image understanding, e.g., surveillance, intelligent vision, smart cameras, etc., media conversion, e.g., speech to text, picture to speech, speech to picture, etc., information retrieval, e.g., quickly and efficiently searching for various types of multimedia documents of interest to the user, and filtering to receive only those multimedia data items that satisfy the user's preferences in a stream of audiovisual content.

For example, a code in a television program triggers a suitably programmed VCR to record that program, or an image sensor triggers an alarm when a certain visual event happens. Automatic transcoding may be performed based on a string of characters or audible information or a search may be performed in a stream of audio or video data. In all these examples, the audiovisual information has been suitably "encoded" to enable a device or a computer code to take some action.

In the infancy of web-based information communication and access systems, information is routinely transferred, searched, retrieved and processed. Presently, much of the information is predominantly represented in text form. This text-based information is accessed using text-based search algorithms. However, as web-based systems and multimedia technology continue to improve, more and more information is becoming available in a form other than text, for instance as images, graphics, speech, animation, video, audio and movies. As the volume of such information is increasing at a rapid rate, it is becoming important to be easily able to search and retrieve a specific piece of information of interest. It is often difficult to search for such information by text-only search. Thus, the increased presence of multimedia information and the need to be able to find the required portions of it in an easy and reliable manner, irrespective of the search engines employed, have spurred on the drive for a standard for accessing such information.

The Moving Pictures Expert Group (MPEG) is a working group under the International Standards Organizationllnternational Electrotechnical Commission in charge of the development of international standards for compression, decompression, processing and coded representation of video data, audio data and their combination.

MPEG previously developed the MPEG-1, MPEG-2 and MPEG-4 standards, and is presently developing the MPEG-7 standard, formally called "Multimedia Content Description Interface", hereby incorporated by reference in its entirety. MPEG-7 will be a content representation standard for multimedia information search and will include techniques for describing individual media content and their combination. Thus, the goal of the MPEG-7 standard is to provide a set of standardized tools to describe multimedia content. Thus, the MPEG-7 standard, unlike the MPEG-i, MPEG-2 or MPEG-4 standards, is not a media-content coding or compression standard but rather a standard for representation of descriptions of media content.

The data representing descriptions is called meta data. Thus, irrespective of how the media content is represented, e.g., analogue, PCM, MPEG-1, MPEG-2, MPEG-4, Quicktime, Windows Media etc., the meta data associated with this content, may in the future, be MPEG-7.

Often, the value of multimedia information depends on how easy it can be found, retrieved, accessed, filtered and managed. In spite of the fact that users have increasing access to this audiovisual information, searching, identifying and managing it efficiently is becoming more difficult because of the sheer volume of the information. Moreover, the question of identifying and managing multimedia content is not just restricted to database retrieval applications such as digital libraries, but extends to areas such as broadcast channel selection, multimedia editing and multimedia directory services.

Although known techniques for tagging audiovisual information allow some limited access and processing based on text-based search engines, the amount of information that may be included in such tags is somewhat limited. For example, for movie videos, the tag may reflect the name of the movie or a list of actors; however, this information must apply to the entire movie and may not be sub-divided to indicate the content of individual shots and objects in such shots. Moreover, the amount of information that may be included in such tags and architecture for searching and processing that information is severely limited.

Additionally, image, video, speech, audio, graphics and animation are becoming increasingly important components of multimedia information. While image and video are "natural" representations of a scene captured by a scanner or camera, graphics and animation are "synthetic" representations of a scene often generated using parametric models on a computer. Similarly, while speech and audio are natural representations of "natural" sound captured using a microphone, text-to-speech or Musical Instrument Digital Interface (MIDI) are representations of "synthetic" sound generated via a model on a computer or computerized synthesizer. The synthetic audiovisual scenes may contain one or more types of synthetic objects, each represented by an underlying model and animation parameters for that model. Such models may typically be two-dimensional (2d) or three-dimensional (3d). For instance, data of a wireframe model in three dimensions and a number of texture maps may be used to represent an F-15 fighter aircraft. This means that not only a realistic rendering of the F-15 is possible using this data but that this amount of data is sufficient to either synthesize any view of F-15 or interact with it in three dimensions. Due to popularity of such 3d content on the web, a textual language for representation of 3d models and their animation has been standardized by ISO and is called Virtual Reality Modeling Language (VRML). However, this language is designed at a very low level and, although it is quite useful for synthesis of 3d content, it may not be fully appropriate for its description in the ways users might want to query for such content.

SUMMARY OF THE INVENTION

Despite the increasing number databases of such content and users needing the ability to search these databases to find something for which they are looking, search and retrieval of synthetic audiovisual content remains a significant challenge which is yet to be addressed in a satisfactory manner. In actuality, search for synthetic content can be performed either in the rendered domain or in its original (model and animation parameters) domain. Searching in the rendered domain is in fact very similar to searching for images and video and is therefore, not the primary focus of this invention.

Rather, this invention improves searching capabilities in the original domain. Within the context of requirements of proposals for the MPEG-7 standard, this invention addresses this challenge and proposes a system and a method for processing and description of synthetic audiovisual data to make it easy to search and browse.

Accordingly, the present invention addresses the need for describing synthetic audiovisual information in a way that allows humans, software components or devices to easily identify, manage and categorize it. Such a manner of describing synthetic audiovisual content data allows ease of search by a user who may be interested in locating a specific piece of synthetic content from a database, Internet, or broadcast media. Moreover, in another application of the manner of describing synthetic audiovisual content, an automated information processing device may be able to locate the unique features of synthetic audiovisual content in a database or detected in a broadcast and take the necessary actions such as filter, collect, manage or record it.

The exemplary embodiment of the present invention provides a system and method that describes information in such a way that characteristics of synthetic audiovisual information are more easily searched, located and presented. More particularly, when describing an audiovisual scene, the scene may be partitioned into individual objects and their spatial and temporal relationships. Further, a description or meta data may be associated with the synthetic objects in the scene in accordance with this invention. Therefore, the invention is directed at providing a method and a system for describing synthetic audiovisual content.

The method and system of this invention make it easier to search, browse and retrieve synthetic audiovisual content. For instance a user may wish to search for specific synthetic audiovisual objects in digital libraries, Internet web sites or broadcast media. Key characteristics of such content itself are employed to facilitate this. Since synthetic audiovisual content is usually generated using various types of 2d or 3d models and by defining animation parameters of these models, the features of these models and animation characteristics that apply to these features are used for describing the content. The synthetic audiovisual content and its descriptions may then be processed for either direct human consumption or sent to devices, e.g., computers, within a system, or sent over a network, e.g., the Internet, and easily accessed and utilized.

The exemplary embodiment of the present invention addresses the draft requirements of MPEG-7 promulgated by MPEG at the time of the filing of this patent application. That is, the present invention provides object-oriented, generic abstraction and uses objects and events as fundamental entities for description. Thus, the present invention provides an efficient framework for description of various types of synthetic visual data. The present invention is a comprehensive tool for describing synthetic visual data because it uses eXtensible Markup Language (XML), which is self-describing. The present invention also provides flexibility because parts can be instantiated so as to provide efficient organization. The present invention also provides extensibility and the ability to define relationships between data because elements defined in a Description Scheme (DS) can define new elements.

These and other features and advantages of this invention are described in or are apparent from the following detailed description of the system and method according to this invention.

BRIEF DESCRIPTION OF THE DRAWINGS

The benefits of these objects of the present invention will be readily appreciated and understood from consideration of the following detailed description of the exemplary embodiment of this invention, when taken together with the accompanying drawings, in which.

DETAILED DESCRIPTION OF PREFERRED EMBODIMENT

Figure 1:
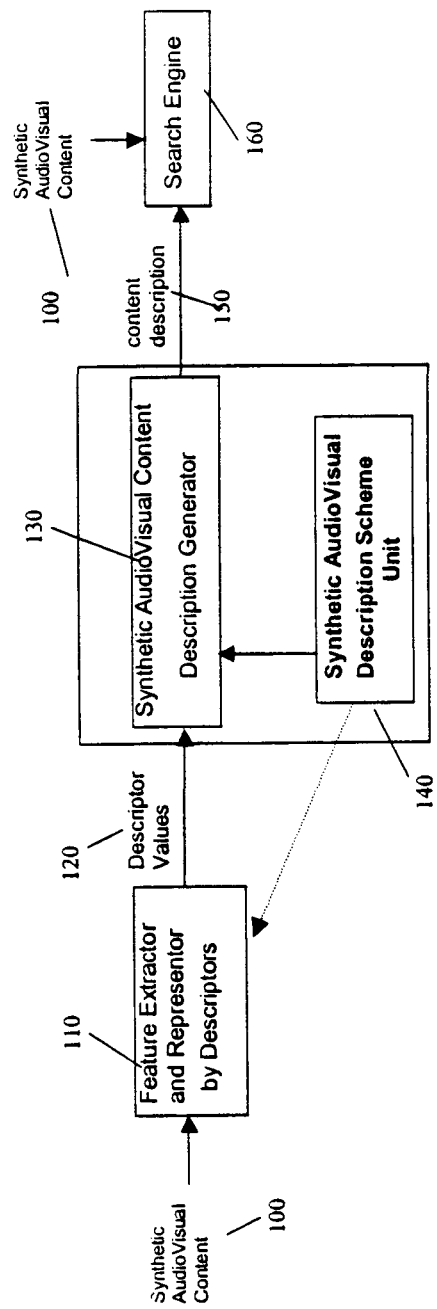
FIG. 1 is a high level representation illustrating the use of descriptors and description according to principles of the invention.

Prior to explaining the exemplary embodiment of the invention, a brief synopsis of MPEG-7 is provided to aid in the reader's understanding of how the exemplary embodiment processes synthetic visual data within the construct of MPEG-7.

MPEG-7 is directed at providing a standard that allows quick and efficient searching for various types of multimedia material interesting to the user. MPEG-7 is meant to provide standardization of multimedia content descriptions. MPEG-7 expects to extend the limited capabilities of proprietary solutions in identifying content that exist today, notably by including multimedia data types. In other words, MPEG-7 will specify a standard set of descriptors that can be used to describe various types of multimedia information. MPEG-7 will also specify predefined structures of descriptors and their relationships, as well as ways to define one's own structures. These structures are called description schemes (DSs). Defining new DSs can be performed using a special language, the Description Definition Language (DDL), which is also a part of the MPEG-7 standard. A description, i.e., a set of instantiated DSs is associated with data content itself to allow fast and efficient searching for material of a user's interest. MPEG-7 will also include coded representations of a description for efficient storage, or fast access.

Conventionally, search engines each have individual syntax formats that differ. These differences in syntax format cause compatibility issues between search criteria, e.g., identical criteria used by different engines results in different results. With the use of DSs under MPEG-7, these search engines will be able to process MPEG-7 multimedia content regardless of the differing syntax formats to produce the same results. The requirements of MPEG-7 apply, in principle, to both real-time and non-real time applications. Also, MPEG-7 will apply to push and pull applications. However, MPEG-7 will not standardize or evaluate applications. Rather, MPEG-7 will interact with many different applications in many different environments, which means that it will need to provide a flexible and extensible framework for describing multimedia data. Therefore, MPEG-7 will not define a monolithic system for content description. Rather, MPEG-7 will define a set of methods and tools for describing multimedia data. Thus, MPEG-7 expects to standardize a set of descriptors, a set of DSs, a language to specify DSs (and possibly descriptors), e.g., DDL, and one or more ways to encode descriptions.

A starting point for DDL is the XML, although it is expected that the basic XML will eventually need to be customized and modified for use in MPEG-7.

The exemplary embodiment of the invention described herein with reference to FIGS. 1-9 conforms to the requirements of the MPEG-7 standard, in its present form. However, it should be appreciated and foreseeable to one of ordinary skill in the art that the exemplary embodiment of the invention will conform to additional and different requirement of the formal MPEG-7 standard, once it has been adopted, without departing from the scope of the invention.

The following description of the description of exemplary embodiment of the invention uses terminology that is consistent with definitions provided in the MPEG-7 call for proposals document. The term "data" indicates audiovisual information that is described using MPEG-7, regardless of storage, coding, display, transmission, medium or technology. Data encompasses, for example, graphics, still images, video, film, music, speech, sounds, text and any other relevant audiovisual medium. Examples of such data may be found in, for example, an MPEG-4 stream, a videotape, a compact disc containing music, sound or speech, a picture printed on paper or an interactive multimedia installation on the World Wide Web.

A "feature" indicates a distinctive characteristic of the data that signifies something to someone. Examples of features include image color, speed pitch, audio segment rhythm, video camera motion, video style, movie title, actors names in a movie, etc. Examples of features of visual objects include shape, surface, complexity motion, light, color, texture, shininess and transparency.

A "descriptor" is a representation of a feature. It is possible to have several descriptors representing a single feature. A descriptor defines the syntax and the semantics of the feature representation. A descriptor allows the evaluation of the corresponding feature via the descriptor value. Examples of such descriptors include color histogram, frequency component average, motion field, title text, etc.

A "descriptor value" is an instantiation of a descriptor for a given data set. Descriptor values are combined using a DS to form a description.

A "description scheme", DS, specifies the structure and semantics of relationships between its components, which may be both descriptors and DSs. The distinction between a DS and a descriptor is that a descriptor contains only basic data types, as provided by the DDL. A descriptor also does not refer to another descriptor or DS. Examples of DSs include movies that include temporally structured data as scenes and shots, including some textual descriptors at the scene level, and color, motion and some audio descriptors at the shot level.

A "description" includes a DS and the set of descriptor values that describe the data. Depending on the completeness of the set of descriptor values, the DS may be fully or partially instantiated. Additionally, it is possible that the DS may be merely incorporated by reference in the description rather than being actually present in the description. A "coded description" is a description that has been encoded to fulfill relevant requirements such as compression efficiency, error resilience, random access, etc. The description definition language, or DDL, is the language that allows the creation of new DSs and, possibly, new descriptors. The DDL also allows the extension and modification of existing DSs.

MPEG-7 data may be physically located with the associated audiovisual material, in the same data stream or on the same storage system, but the descriptions can also be stored elsewhere. When the content and its descriptions are not co-located, mechanisms that link audiovisual material and their MPEG-7 descriptions are needed; these links must work in both directions.

As mentioned above, the exemplary embodiment of the invention provides a DS for synthetic visual content synthetic visual content relates to artificial visual objects, such as facial animation or graphics used in multimedia. synthetic visual content data is generated by animating visual objects defined by a virtual wireframe and a texture map. Animation is provided to move the visual objects using an animation stream for nodes of the virtual wireframe. These animation stream nodes can be linked to visual contents such as, for example, the type of wireframe, reference to the wireframe within a library of thousands of wireframes, wireframe parameters, reference to a texture map, parameters of the texture map, parameters of the animation stream, etc.

Also as mentioned above, the exemplary embodiment meets the MPEG-7 requirements outlined in the present draft of MPEG-7 standard requirements. Requirements include criteria relating to descriptors, DSs requirements, DDL requirements and system requirements. While the exemplary embodiment of the invention should satisfy all requirements of MPEG-7 when taken as a whole, not all requirements have to be satisfied by each individual descriptor or DS. The descriptor requirements include cross-modality, direct data manipulation, data adaptation, language of text-based descriptions, linking, prioritization of related information and unique identification. DS requirements include DS relationships, descriptor prioritization, descriptor hierarchy, descriptor scalability, temporal range description, data adaptation, compositional capabilities, unique identification, primitive data types, composite data types, multiple media types, various types of DS instantiations, relationships within a DS and between DSs, relationship between description and data, links to ontologies, platform independence, grammar, constraint validation, intellectual property management and protection, human readability and real time support.

While a DS can be generated using any DDL, the exemplary embodiment of the invention uses eXtensible Markup Language (XML) to represent the synthetic visual DS. The synthetic visual DS includes several basic components: objects, animation streams and object feature structures. XML is a useful subset of SGML. XML is easier to learn, use and implement than SGML. XML allows for self-description, i.e., allows description and structure of description in the same format and document. Use of XML also allows linking of collections of data by importing external document type definitions using DSs.

Additionally, XML is highly modular and extensible. XML provides a self-describing and extensible mechanism, and although not media-centric, can provide a reasonable starting basis. Another major advantage of using XML is that it allows the descriptions to be self-describing, in the sense that they combine the description and the structure of the description in the same format and document. XML also provides the capability to import external Document Type Definitions (DTDs), e.g., for feature descriptors, into the image DS DTD in a highly modular and extensible way.

According to the exemplary embodiment of the invention, each synthetic audiovisual description can include synthetic audio or visual objects. Each synthetic visual object can be associated with an animation stream. Each synthetic visual object has one or more associated synthetic features. The synthetic features of an object are grouped together as being visual, audio or a relationship on semantic or media. In the synthetic visual DS, each feature of an object has one or more associated descriptors.

The synthetic visual DS also includes specific DTDs, also generated using the XML framework, to provide example descriptors. The DTD provides a list of the elements, tags, attributes, and entities contained in the document, and their relationships to each other. DTDs specify a set of rules for the structure of a document. For example, a DTD specifies the parameters needed for certain kinds of documents. Using the synthetic visual DS, DTDs may be included in the file that contains the document they describe. In such a case, the DTD is included in a document's prolog after the XML declaration and before the actual document data begins. Alternatively, the DTD may be linked to the file from an external URL. Such external DTDs can be shared by different documents and Web sites. In such a way, for a given descriptor, the synthetic visual DS can provide a link to external descriptor extraction code and descriptor similarity code.

The DS provides flexibility by allowing components of the DS to be instantiated, using efficient categorization of features and supporting efficient linking, embedding, or downloading of external feature descriptor and execution codes. Elements defined in the synthetic visual DS can be used to derive new elements. Further, the synthetic visual DS is closely related to other elementary media DS, e.g., image DS, video DS, and included in the DS for multimedia, e.g., integration DS.

One unique aspect of the synthetic visual DS is the capability to define multiple abstraction levels based on a chosen criterion. The criteria can be specified in terms of visual features, e.g., size, semantic relevance, e.g., relevance to a user's interest profile, or service quality, e.g., media features.

There are two basic cases in which synthetic visual content must be described to facilitate search and retrieval. In a first case, the synthetic visual content is assumed to be pre-rendered. In a second case, a description of unrendered content is described to facilitate search and retrieval. The exemplary embodiment of the invention serves to describe such unrendered content. Therefore, the synthetic visual DS is designed to describe MPEG-4 synthetic visual content and VRML content effectively.

DTDs of synthetic visual DSs can be designed and created using XML. A document type definition provides a list of the elements, tags, attributes, and entities contained in the document, and their relationships to each other. Description schemes specify a set of rules for the structure of a document. Description schemes may be included in the file that contains the document they describe, or they may be linked to form an external URL. Such external DSs can be shared by different documents and Web sites. A DS may be included in a document's prolog after the XML declaration and before the actual document data begins.

Audiovisual material that has MPEG-7 data associated with it, may include still pictures, graphics, 3D models, audio, speech, video, and information about how these elements are combined in a multimedia presentation, i.e., scenario composition information. A special case of this general data type may include facial expressions and personal characteristics.

FIG. 1 is a high level representation illustrating the use of descriptors and description according to principles of the invention. As shown in FIG. 1, a synthetic audiovisual content description generator 130 uses synthetic audiovisual content DS provided by synthetic audiovisual DS unit 140 to provide synthetic audiovisual content description 150 to a search engine 160. This search engine 160 has access to the synthetic audiovisual content 100 directly as well. The synthetic audiovisual content description 150 provides a way of indexing the synthetic audiovisual content 100.

On-line operation of the search engine 160 to provide search results in response to a content query is explained below in detail with reference to FIG. 9. In contradistinction, FIG. 1 illustrates the off-line processing of synthetic audiovisual data 100. Specifically, the feature extractor and representor 110 represent the synthetic audiovisual data 100, using descriptors. These descriptors are determined based on the synthetic audiovisual DS supported by the synthetic audiovisual DS unit 140. Different descriptors may be selected depending on the selected synthetic audiovisual DS. The feature extractor and representor 110 produce descriptor values 120 indicative of the synthetic audiovisual content 100.

The descriptor values 120 are input to the synthetic audiovisual content description generator 130, which generates content description 150 based on the descriptor values 120 and the synthetic audiovisual DS supported by the synthetic audiovisual DS unit 140. Thus, the content description 150 is generated off-line, e.g., at a convenient or arbitrary time that may or may not be related to synthetic audiovisual data downloading from a database or a broadcast.

The above explanation refers to a synthetic audiovisual DS supported by the synthetic audiovisual DS unit 140 because the generator 130 may refer to various DSs that may be provided by vendors of synthetic audiovisual data content 100 or by others.

Figure 2:
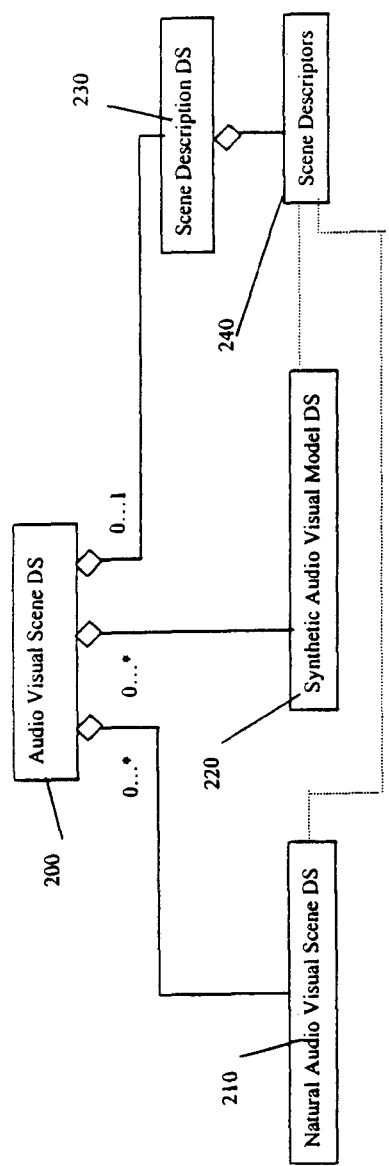
FIG. 2 is a schematic representation in UML (Unified Modeling Language) of a relation between audiovisual scene DS and synthetic audiovisual model DS according to the exemplary embodiment of the invention.

FIG. 2 is a schematic representation in UML of a relation between an audiovisual scene DS 200 and synthetic audiovisual model DS 220 according to the exemplary embodiment of the invention. As shown in FIG. 2, the audiovisual scene DS 200 can incorporate, i.e., aggregate, a natural audiovisual scene DS 210, a synthetic audiovisual model DS 220, a scene description DS 230 and scene descriptors 240. The audiovisual scene DS 200 may incorporate any of the elements 220-240 but is not required to include any of them. Therefore, elements 220-240 may be incorporated in various combinations within the audiovisual scene DS 200. More specifically, the audiovisual scene DS 200 may incorporate any quantity of natural audiovisual scene DSs 210 and synthetic audiovisual model DSs 220. However, the audiovisual scene DS 200 may either incorporate no scene description DS 230 or one scene DS DS 230. The scene description DS 230 incorporates at least one scene descriptor 240. The synthetic audiovisual model DS 220 and the natural audiovisual scene DS 210 may also be linked to the scene descriptors 240.

Figure 3:
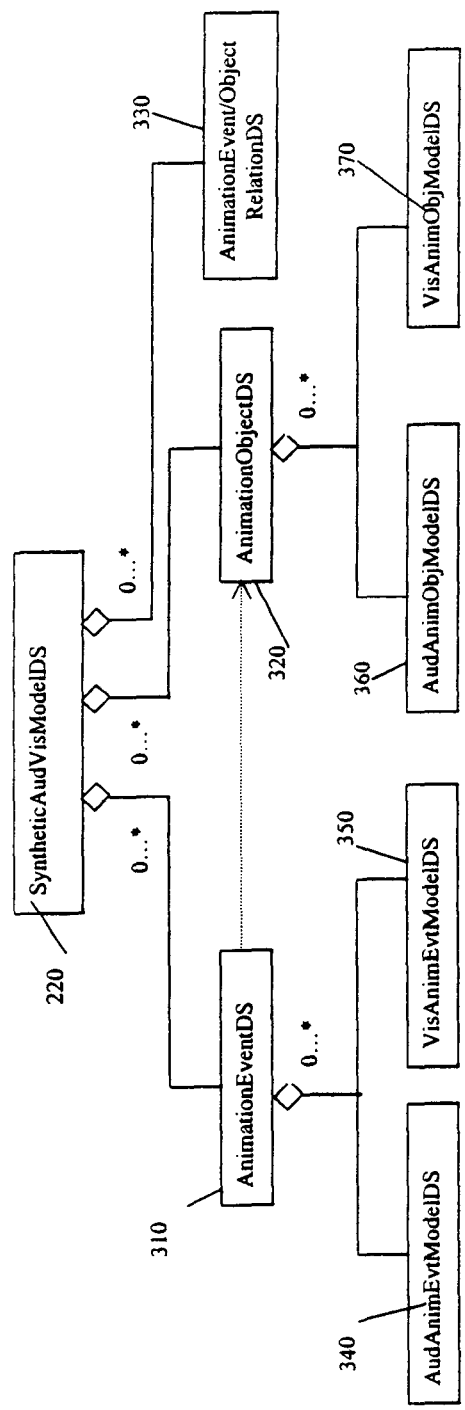
FIG. 3 is a schematic representation in UML of a synthetic audiovisual model DS in XML illustrating its elements and their relationships according to the exemplary embodiment of the invention.

FIG. 3 is a schematic representation of a synthetic audiovisual model DS 220 in UML illustrating its elements and their relationships according to the exemplary embodiment of the invention. As shown in FIG. 3, the synthetic audiovisual model DS 220 may incorporate an animation event DS 310, an animation object DS 320 and an animation event/object relation DS 330; synthetic audiovisual model DS 220 may incorporate any number or each of elements 310-330 or incorporate none of each of them. The synthetic audiovisual model DS 220 incorporates DSs that correspond to both static and dynamic characteristics. Specifically, the animation event DS 310 corresponds to dynamic characteristics, e.g., changing facial expression of computer generated face model, movement of a car model. The animation object DS 320 corresponds to static characteristics, e.g., definition parameters of face, color of that car model. The animation event/object relation DS 330 corresponds to synthetic audiovisual data related to the relationship between animation objects and animation events.

The animation event DS 310 may incorporate any number of each of the audio animation event model DSs 340 and visual animation event model DSs 350. That is, the animation event DS 310 may incorporate elements 340 and 350 in any number.

The animation object DS 320 may incorporate any number of each of the audio animation object model DSs 360 and visual animation object model DSs 370. That is, the animation object DS 320 may incorporate each of elements 360 and 370 in any number.

Figure 4:
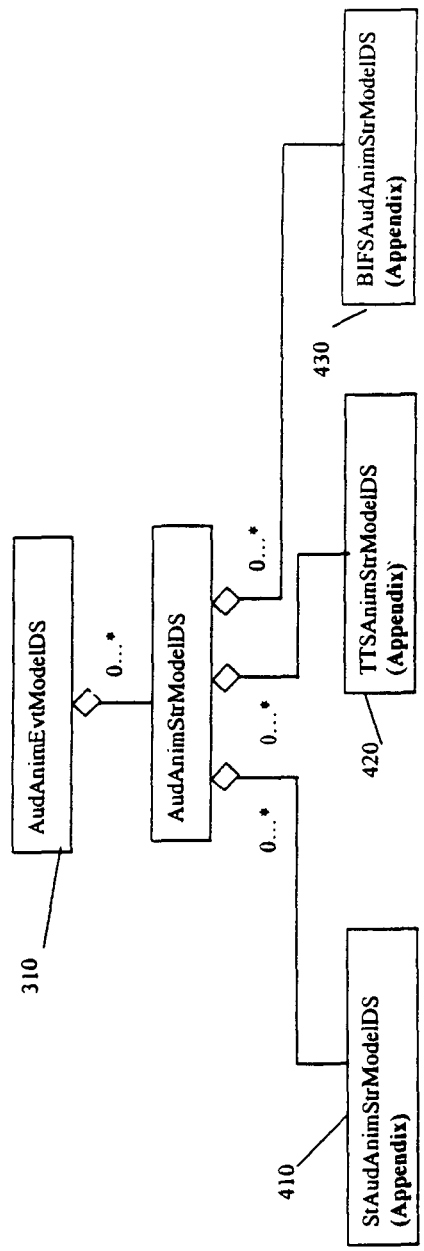
FIG. 4 is a schematic representation in UML of an audio animation event model DS in XML illustrating its elements and their relationships according to the exemplary embodiment of the invention.

FIG. 4 is a schematic representation of an audio animation event model DS 340 in UML illustrating its elements and their relationships according to the exemplary embodiment of the invention. As shown in FIG. 4, the audio animation event model DS 340 may incorporate an audio animation stream model DS 410. The audio animation stream model DS 410 may incorporate a number of each of a structured audio animation stream model DS 420, a Text To Speech (TTS) stream model DS 430 and a BInary Format for scenes (BIFS) audio animation stream model DS 440. That is, the audio animation stream model DS 410 may incorporate each of elements 420-440 in any number.

The structured audio animation stream model DS 420 may be, for example, MIDI. The BIFS audio animation stream model DS 440 is an MPEG-4 scene description and is similar to a DS generated using VRML but BIFS is its binary version. The Appendix includes computer code in XML including an example of a structured audio animation stream model DS 420, a TTS animation stream model DS 430 and a BIFS audio animation stream model DS 440.

Figure 5:
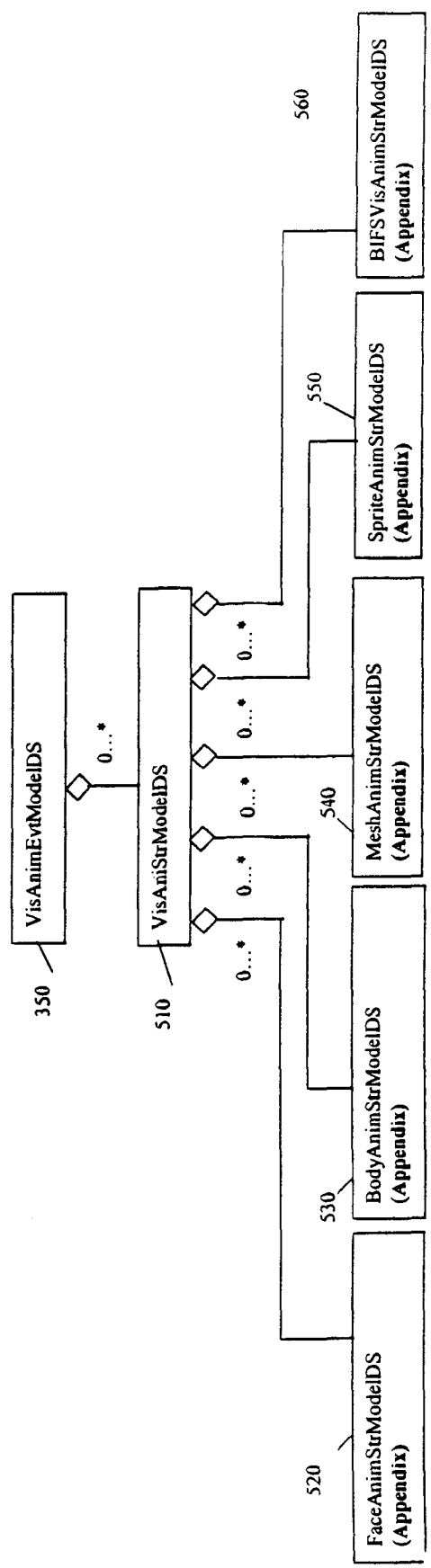
FIG. 5 is a schematic representation in UML of a visual animation event model DS in XML illustrating its elements and their relationships according to the exemplary embodiment of the invention.

FIG. 5 is a schematic representation of a visual animation event model DS 350 in UML illustrating its elements and their relationships according to the exemplary embodiment of the invention. As shown in FIG. 5, the visual animation event model DS may incorporate any number of visual animation stream model DSs 510. A visual animation stream model DS 510 may incorporate any number of each of a face animation stream model DS 520, a body animation stream model DS 530, a mesh animation stream model DS 540, a sprite animation stream model DS 550 and a BIFS visual animation stream model DS 560. The Appendix also includes computer code in XML including an example of a face animation stream model DS 520, a body animation stream model DS 530, a mesh animation stream model DS 540 a sprite animation stream model DS 550 and a BIFS visual animation stream model DS 560.

Figure 6:
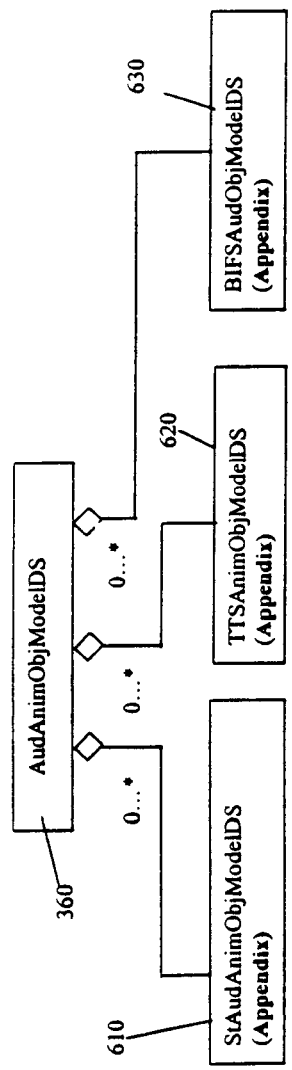
FIG. 6 is a schematic representation in UML of an audio animation object model DS in XML illustrating its elements and their relationships according to the exemplary embodiment of the invention.

FIG. 6 is a schematic representation of an audio animation object model DS 360 in UML illustrating its elements and their relationships according to the exemplary embodiment of the invention. As shown in FIG. 6, the audio animation object model DS 360 may incorporate any number of each of a structured animation object model DS 610, a TTS animation object model DS 620 and a BIFS audio object model DS 630. That is, the audio animation object model DS 360 may incorporate each of elements 610-630 in any number. The Appendix also includes computer code including an example of a structured audio animation object model DS 610, a TTS animation object model DS 620 and a BIFS audio object model DS 630.

Figure 7:
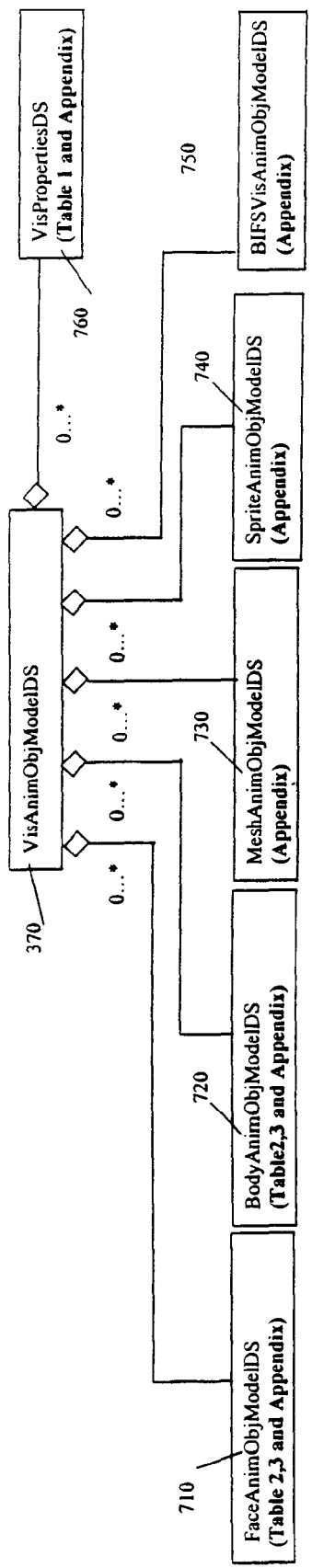
FIG. 7 is a schematic representation in UML of a visual animation object model DS in XML illustrating its elements and their relationships according to an exemplary embodiment of the invention.

FIG. 7 is a schematic representation of a visual animation object model DS 370 in UML illustrating its elements and their relationships according to an exemplary embodiment of the invention. As shown in FIG. 7, the visual animation object model DS 370 may incorporate any number of each of a face animation object model DS 710, a body animation object model DS 720, a mesh animation object model DS 730, sprite animation object model DS 740, a BIFS visual animation object model DS 750 and a visual properties DS 760. That is, the visual animation object model DS 370 may incorporate each of elements 710-760 in any number. The Appendix also includes computer code including an example of a face animation object model DS 710, a body animation object model DS 720, a mesh animation object model DS 730, sprite animation object model DS 740, a BIFS visual animation object model DS 750 and a visual properties DS 760.

Additionally, Table 1 includes further information about the visual properties DS 760. Specifically, the visual properties DS 760 may include features such as location, text annotation, synthetic shape synthetic surface(s), synthetic complexity, synthetic motion(s) synthetic event input/output(s) and synthetic light(s). Table 1 also includes additional information about the descriptors that may be used define these features. For example, the feature of synthetic shape may include normal histogram descriptors, synthetic silhouette descriptors or three dimensional bounding box descriptors.

TABLE 1

| Element | Must Contain | May Contain | Must Be Contained in |
|---|---|---|---|
| VisProperties | | location<br>text_annotation<br>syn_shape<br>syn_surface(s)<br>syn_complexity<br>syn_motion(s)<br>syn_eventI/O(s)<br>syn_light(s) | (root element) |
| syn_shape | | normal histogram<br>syn_silhouette<br>3D_bounding_box | VisProperties |
| syn_silhouette | | shape<br>angle | syn_shape |
| syn_surface | | image<br>video<br>color<br>specular_color<br>shininess<br>transparency | VisProperties |
| syn_complexity | | num_transform<br>num_scripts<br>num_polygon_equiv<br>num_routes<br>num_interpolators | VisProperties |
| syn_motion | | ego_motion | VisProperties |
| syn_eventI/O | | sensors | VisProperties |
| light | | directional<br>point<br>spot<br>ambient<br>color | VisProperties |

Tables 2 and 3 include additional information about the face and body animation object model DSs 710 and 720. Specifically, Table 2 shows that one example of the face animation object model DS 710 may include descriptors relating to gender, person identification, tongue information teeth information glasses and hair, as well as a TTS interface, a facial animation parameter (FAP) interface, a FAP interface a FAP stream. Similarly, one example of the body animation object model DS 730 may include descriptors relating to gender, person identification, number of joints, number of hand joints, number of spine joints, and clothes as well as a body animation parameters (BAP) interface and a BAP stream. Table 3 provides further information about the contents of the FAP and BAP streams.

TABLE 2

| Element | Must Contain | May Contain | Must Be Contained in |
|---|---|---|---|
| FaceAnimObjModel | | gender<br>person_id<br>TTS_interface<br>FAP_interface<br>FAP stream_<br>tongue<br>teeth<br>glasses<br>hair | VisAnimObjModel |
| BodyAnimObjModel | | gender<br>person_id<br>BAP_interface<br>BAP stream<br>num joints<br>num_hand joints<br>num_spine joints<br>clothes | VisAnimObjModel |

TABLE 3

| Element | Must Contain | May Contain | Must Be Contained in |
|---|---|---|---|
| FAP stream | | expressions<br>visemes<br>low_level_FAP<br>text_annotation<br>location | FaceAnimObjModel |
| BAP_stream | | body_BAP<br>hand BAP<br>text_annotation<br>location | BodyAnimObjModel |

Figure 8:
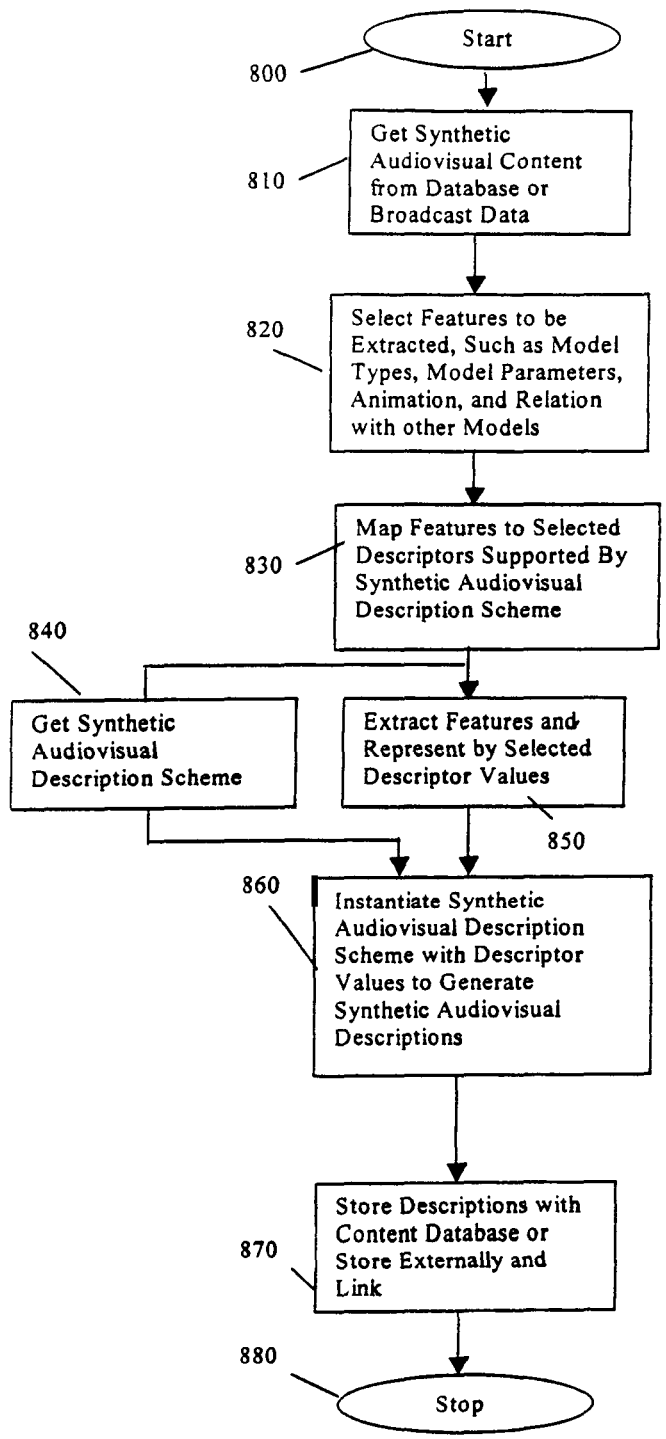
FIG. 8 illustrates a method for generation of descriptions in accordance with the exemplary embodiment of the invention.

FIG. 8 illustrates a method for generation of descriptions in accordance with the exemplary embodiment of the invention. The method illustrated in FIG. 8 is preferably performed off-line and not in real-time. As shown in FIG. 8, the method begins in step 800 and proceeds to step 810. In step 810, synthetic audiovisual content is obtained from a database or broadcast data and control proceeds to step 820. In step 820, features are selected to be extracted from the synthetic audiovisual content. For example, selected features may include model types, model parameters, animation and relation with other models. Control the proceeds to step 830, in which the selected features are mapped to descriptors supported by the selected synthetic audiovisual DS.

The descriptors are selected based on the synthetic audiovisual DS selected for the describing the synthetic audiovisual content obtained in step 810. Control then proceeds to steps 840 and 850. In step 840, the selected synthetic audiovisual DS is accessed. In step 850, features of the synthetic audiovisual content are extracted and represented using selected descriptor values consistent with the selected synthetic audiovisual DS. Preferably, steps 840 and 850 are performed simultaneously for the purpose of efficiency; however, it should be appreciated that steps 840 and 850 may be performed in any order in relationship to each other.

Following completion of both steps 840 and 850, control proceeds to step 860. In step 860, the selected synthetic audiovisual DS is instantiated with the descriptor values generated in step 850 to generate synthetic audiovisual descriptions corresponding to the synthetic audiovisual content obtained in step 810. Control then proceeds to step 870, in which the generated synthetic audiovisual descriptions are stored. The generated synthetic audiovisual descriptions may be stored with the corresponding synthetic audiovisual content or stored remotely from and linked to the corresponding synthetic audiovisual content. Control then proceeds to step 880, in which the method for off-line generation of content descriptions ends.

Figure 9:
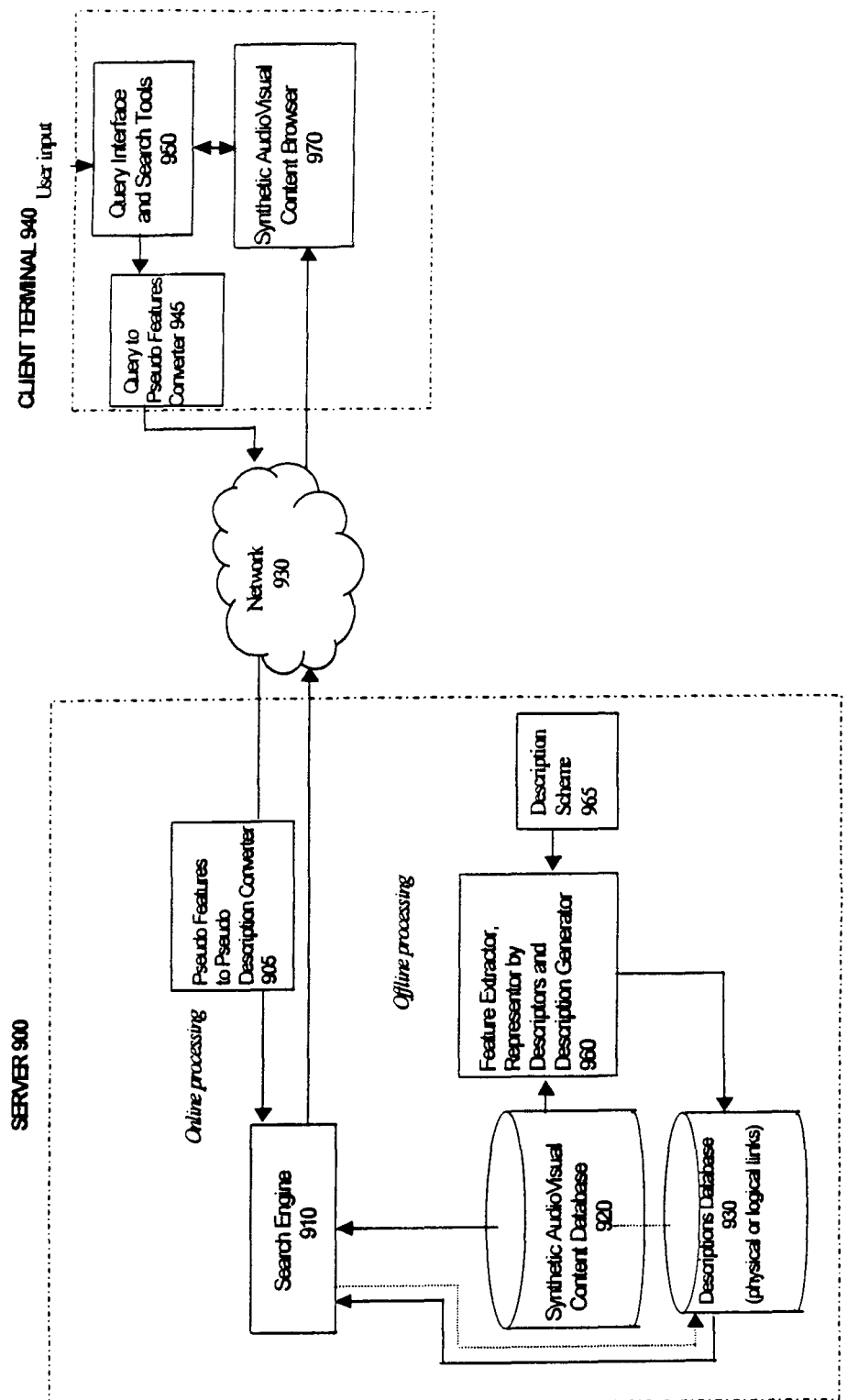
FIG. 9 illustrates a system for generation and use of synthetic audiovisual content descriptions that implements the exemplary embodiment of the invention.

FIG. 9 illustrates a system for generation as well as use of synthetic audiovisual content descriptions that implements the exemplary embodiment of the invention. As shown in FIG. 9, the system may include a server 900 coupled to a client terminal 940 via a network 930. The server may incorporate a search engine 910, a synthetic audiovisual content database 920, a descriptions database 930 a pseudo features to pseudo description converter 905 and a feature extractor, representor by descriptor and description generator 960. The synthetic audiovisual content database 920 and the descriptions database 930 may be coupled to one another via, for example, a physical or a logical link. The client terminal 940 may include a query interface and search tools 950 and a synthetic audiovisual content browser 970. The feature extractor, representor by descriptors and description generator 960 corresponds to all of the elements 110-130 illustrated in FIG. 1.

It is important to appreciate that FIG. 9 illustrates an example of architecture that may utilize the exemplary embodiment of the invention. Additionally, FIG. 9 illustrates processing actions performed by this architecture both on-line and off-line. Specifically, FIG. 9 illustrates the use of a DS 965 to perform feature extraction and representation by descriptors and description generation. These processing actions are performed based on the synthetic audiovisual content stored in the database 920 and the DS 965. The resulting generated descriptions are stored in the descriptions database 930. As illustrated in FIG. 9, these processing actions are performed off-line.

In contradistinction, remaining actions performed by architecture illustrated in FIG. 9 are performed on-line. For example, when a user inputs a synthetic audiovisual data query through the query interface and search tools 950, the search tools send the query to a query to pseudo features converter 945 that maps the query to pseudo features and submit the pseudo features to the server 900 over the network 930. The network 930 may be a public or private network, for example, any conventionally known intranet or the Internet. Once received in the server 900, the pseudo features are converted to pseudo description using the pseudo features to pseudo description converter 905. The search engine 910 uses the pseudo description to access the descriptions stored in the descriptions database 930. The search engine 910 then retrieves synthetic audiovisual content stored in database 920 and associated with a description(s) stored in the database 930 that most closely match the pseudo description. The search engine 910 than provides the retrieved synthetic audiovisual content to the client terminal via the network 930, the synthetic audiovisual content browser 970 and the query interface and search tools 950.

Although FIG. 9 illustrates the converters 905 and 945 as separate elements at different physical locations, it should be appreciated that the converters may be a single element located at the server 900, the client terminal 940 or a remote location in the network 930.

The client terminal 940 may be, for example, a personal computer or a digital VCR that receives an audiovisual stream including synthetic audiovisual data, such as a computer animation model and instructions to animate it, e.g., a digital TV program, and descriptions of the audiovisual information associated with the program. Incorporation of descriptions within the audiovisual stream may allow the digital VCR to record, for example, only news with the exclusion of sport. By utilizing the synthetic audiovisual DS, products can be described in such a way that a client terminal 940 can respond to unstructured queries from users making the queries.

While this invention has been described in conjunction with the exemplary embodiment outlined above, it is evident that many alternatives, modifications and variations will be apparent to those skilled in the art. Accordingly, the exemplary embodiment of the invention, as set forth above, is intended to be illustrative, not limiting. Various changes may be made without departing from the spirit and scope of the invention.

For example, an emerging standard from W3C, XML, has been used to represent the DS, although any specific DDL selected by MPEG-7 can be used to serve the same purpose as well.

Additionally, it is important to understand that the specific algorithm used for feature extraction during the description generation process is outside the scope of MPEG-7 standardization. Therefore, any conventional algorithm for feature extraction may be used. Leaving the algorithm undefined enables the exemplary embodiment of the invention to accommodate technological developments in feature extraction and encourage competitive MPEG-7 development.

APPENDIX

Portions of Document Type Definition of AudioVisual Scene
that deal with Synthetic AudioVisual Description Scheme

```
<?xml version="1.0" ?>
<!DOCTYPE AudioVisualSceneDS [
<!--AudioVisual Scene -->
<!-- is a collection of natural scene, synthetic models, and scene description -->
<!ELEMENT AudioVisualScene(NaturalAudVisScene, SyntheticAudVisModel+,
SceneDescription)>
<!ATTLIST AudioVisualScene id ID #REQUIRED
            title CDATA #REQUIRED
            description CDATA>
<!-- Scene Description -->
<!Element SceneDescription (Descriptor+)>
<!ATTLIST SceneDescription type (2D | 3D)
            numVisualObjects CDATA #IMPLIED
            numAudioObjects CDATA #IMPLIED>
<!-- Scene Descriptor -->
<!-- establishes the relationship between 2 sets of objects -->
<!ELEMENT Descriptor EMPTY>
<!ATTLIST Descriptor objsA IDREFS #REQUIRED
                objsB IDREFS #REQUIRED
                relType ( Space | Time ) #REQUIRED
                relationship ( LeftRight | UpDown | BeforeAfter | CoStart | CoEnd |
OverLap ) #REQUIRED>
<!-- Natural Audio Visual Scene is outside of the scope of this invention-->
<!-- Synthetic AudioVisual Model -->
<!-- is a collection of animation event, animation object and their relationships -->
<!ELEMENT SyntheticAudVisModel (AnimationEvent, AnimationObject,
AnimationEventObjectRelation )>
<!ATTLIST SyntheticAudVisModel id ID #REQUIRED>
<!-- Animation Event-->
<!ELEMENT AnimationEvent (AudAnimEvtModel, VisAnimEvtModel)>
<!ATTLIST AnimationEvent id ID #REQUIRED
            title CDATA IMPLIED
```

APPENDIX-continued

Portions of Document Type Definition of AudioVisual Scene
that deal with Synthetic AudioVisual Description Scheme

```
            description CDATA #IMPLIED
            animType (Audio | Visual) #REQUIRED
<!-- Audio Animation Event -->
<!ELEMENT AudAnimEvtModel (AudAnimStrModel)>
<!ATTLIST AudAnimEvtModel id ID #REQUIRED
            objRef IDREF #IMPLIED
            type (SHOT | GROUP_SHOTS) #IMPLIED
            eventRef IDREF #IMPLIED
            eventNodeRef IDREFS #IMPLIED>
<!-- Animation stream -->
<!ELEMENT AudAnimStrModel ( StAudAnimStrModel | TTSAnimStrModel |
            BIFSAudAnimStrModel)>
<!ATTLIST AudAnimStrModel id ID #REQUIRED
            description CDATA #IMPLIED
            duration TIME #IMPLIED>
<!ELEMENT StAudAnimStrModel EMPTY>
<!ATTLIST StAudAnimStrModel source %URL; #REQUIRED
            type NOTATION ( StAudAnimStrModel ) "StAud Anim Stream ">
<!ELEMENT TTSAnimAtrModel EMPTY>
<!ATTLIST TTSAnimStrModel source %URL; #REQUIRED
            type NOTATION ( TTSAnimStrModel ) "TTS Anim Stream ">
<!ELEMENT BIFSAudAnimStrModel EMPTY>
<!ATTLIST BIFSAudAnimStrModel source %URL; #REQUIRED
            type NOTATION ( BIFSAudAnimStrModel ) "BIFSAudAnim Stream ">
<!-- Visual Animation Event -->
<!ELEMENT VisAnimEvtModel (VisAnimStrModel)>
<!ATTLIST VisAnimEvtModel id ID #REQUIRED
            objRef IDREF #IMPLIED
            type (SHOT | GROUP_SHOTS) #IMPLIED
            eventRef IDREF #IMPLIED
            eventNodeRef IDREFS #IMPLIED>
<!ELEMENT VisAnimStrModel ( FaceAnimStrModel | BodyAnimStrModel |
            MeshAnimStrModel | SpriteAnimStrModel | BIFSVisAnimStrModel)>
<!ATTLIST VisAnimStrModel id ID #REQUIRED
            description CDATA #IMPLIED
            duration TIME #IMPLIED>
<!ELEMENT FaceAnimStrModel EMPTY>
<!ATTLIST FaceAnimStrModel source %URL; #REQUIRED
            type NOTATION ( FaceAnimStrModel ) "Face Anim Stream">
<!ELEMENT BodyAnimStrModel EMPTY>
<!ATTLIST BodyAnimStrModel source %URL; #REQUIRED
            type NOTATION ( BodyAnimStrModel ) "Body Anim Stream">
<!ELEMENT MeshAnimStrModel EMPTY>
<!ATTLIST MeshAnimStrModel source %URL; #REQUIRED
            type NOTATION ( MeshAnimStrModel ) "Mesh Anim Stream">
<!ELEMENT SpriteAnimStrModel EMPTY>
<!ATTLIST SpriteAnimStrModel source %URL; #REQUIRED
            type NOTATION ( SpriteAnimStrModel ) "Sprite Anim Stream">
<!ELEMENT BIFSVisAnimStrModel EMPTY>
<!ATTLIST BIFVisAnimStrModel source %URL; #REQUIRED
            type NOTATION ( BIFSVisAnimStrModel ) "BIFSVis Anim Stream">
<!-- The Animation object -->
<!ELEMENT AnimationObject (AudAnimObjectModel*, VisAnimObjectModel*)>
<!ATTLIST AnimationObject id ID #REQUIRED
            title CDATA IMPLIED
            description CDATA #IMPLIED
            animType (Audio | Visual) #REQUIRED
<!-- Audio Animation Object -->
<!ELEMENT AudAnimObjModel (StAudAnimObjModel*, TTSAnimObjModel*,
BIFSAudAnimObjModel*)>
<!ELEMENT StAudioAnimObjModel ( MIDI*, SoundFont*)>
<!ELEMENT TTSAnimObjModel EMPTY>
<!ATTLIST TTS gender CDATA #IMPLIED
            text CDATA #IMPLIED
            prosody CDATA #IMPLIED
            language CDATA #IMPLIED
            speechRate CDATA #IMPLIED
            face CDATA #IMPLIED>
<!ELEMENT BIFSAudAnimObjModel EMPTY>
<!-- Visual Animation Object -->
<!ELEMENT VisAnimObjModel ((FaceAnimObjModel | BodyAnimObjModel |
SpriteAnimObjModel | MeshAnimObjModel | BIFSVisAnimObjModel), VisProperties)
<!ATTLIST VisAnimObjModel id ID #REQUIRED
            description CDATA>
<!ELEMENT VisProperties (Location, Shape?, Surface?, Complexity?, Motion?, Light*,
EventIO*)>
<!ELEMENT Shape (Shape2D | Shape3D )>
```

APPENDIX-continued

Portions of Document Type Definition of AudioVisual Scene
that deal with Synthetic AudioVisual Description Scheme

```
<!ELEMENT Shape2D EMPTY>
<!ATTLIST Shape2D type ( FourierDesc | Polygon | MPEG4shape ) #REQUIRED
          data CDATA #REQUIRED>
<!ELEMENT Shape3D EMPTY>
<!ATTLIST Shape3D type (NormalHistogram | Silhouette | 3DBoundingBox)
#REQUIRED data CDATA #REQUIRED>
<!ELEMENT Surface (Color?, SpecularColor?, Texture?, Shininess?, Transparency?)>
<!ELEMENT Color EMPTY>
<!ATTLIST TYPE ( RGB | LUV | HSB ) #REQUIRED
<!ATTLIST DATA CDATA #REQUIRED>
<!ELEMENT Texture EMPTY>
<!ATTLIST Texture type ( TAMURA | WAVELET) #REQUIRED
          data CDATA #REQUIRED>
<!ELEMENT Shininess EMPTY>
<!ATTLIST Shininess type CDATA #IMPLIED
          data CDATA #REQUIRED>
<!ELEMENT Transparency EMPTY>
<!ATTLIST Transparency numValue CDATA #REQUIRED>
<!ELEMENT Complexity EMPTY>
<!ATTLIST Complexity NumTransforms CDATA #IMPLIED
          NumScripts CDATA #IMPLIED
          NumPolygons CDATA #IMPLIED
          NumRoutes CDATA #IMPLIED
          NumInterpolators CDATA #IMPLIED>
<!ELEMENT Motion ( EgoMotion+)>
<!ATTLIST EgoMotion EMPTY)>
<!ATTLIST EgoMotion type CDATA #REQUIRED
          data CDATA #REQUIRED>
<!ELEMENT Light ( Color? )>
<!ATTLIST Light TYPE ( DIRECTIONAL | SPOT | POINT | AMBIENT) #IMPLIED>
<!ELEMENT EventIO EMPTY)
<!ATTLIST EventIO type ( PROXIMITY | CYLINDER | MOTION) #REQUIRED
          number CDATA #REQUIRED >
<!-- Face/Body Anim Object -->
<!ELEMENT FaceBodyAnimObjModel ((FaceAnimObjModel | BodyAnimObjModel),
TtsInterface)>
<!ATTLIST FaceBodyAnimObjModel personID CDATA #REQUIRED
          gender CDATA #REQUIRED
          type ( FACE | BODY) #REQUIRED>
<!ELEMENT FaceAnimObjModel (FapInterface)>
<!ATTLIST FaceAnimObjModel faStreamRef IDREF #REQUIRED
          tongue CDATA #REQUIRED
          teeth CDATA #REQUIRED
          glasses CDATA #REQUIRED
          hair CDATA #IMPLIED>
<!ELEMENT BodyAnimObjModel (BaInterface)>
<!ATTLIST Body baStreamRef IDREF #REQUIRED
          numJoints CDATA #IMPLIED
          numHandJoints CDATA #IMPLIED
          numSpineJoints CDATA #IMPLIED
          clothes CDATA #IMPLIED>
<!-- Sprite Anim Object-->
<!ELEMENT SpriteAnimObjModel(spriteobj)>
<!ELEMENT spriteobj(spriteobj_info, code*)>
<!ELEMENT spriteobj_info(sprite_dim, sprite_shape, sprite_trajectory, sprite_warp,
sprite_brightness, sprite_texture)>
<!ELEMENT sprite_dim(sprite_size, sprite_num_pts, sprite_coord)>
<!ELEMENT sprite_size EMPTY>
<!ATTLIST sprite_size
    sprite_width CDATA #REQUIRED
    sprite_height CDATA #REQUIRED>
<!ELEMENT sprite_num_pts EMPTY>
<!ATTLIST sprite_num_pts
    num_pts CDATA #REQUIRED>
<!ELEMENT sprite_coord EMPTY>
<!ATTLIST sprite_coord
    xcoord CDATA #REQUIRED
    ycoord CDATA #REQUIRED>
<!ELEMENT sprite_shape(shape)>
<!ELEMENT sprite_trajectory (motion)>
<!ELEMENT sprite_warp EMPTY>
<!ATTLIST sprite_warp
    num_pts CDATA #REQUIRED>
<!ELEMENT sprite_brightness EMPTY>
<!ATTLIST sprite_brightness
    avgbright CDATA #REQUIRED
    varbright CDATA #REQUIRED>
```

APPENDIX-continued

Portions of Document Type Definition of AudioVisual Scene
that deal with Synthetic AudioVisual Description Scheme

```
<!ELEMENT sprite_texture(texture)>
<!-- Mesh Anim Object Model 2D or 3D -->
<!-- Mesh Anim Object Model 2D -->
<!ELEMENT MeshAnimObjModel2D(mesh_geom, mesh_motion)>
<!ELEMENT mesh_geom(mesh_geom_info, mesh_geom_field)>
<!ELEMENT mesh_geom_info(mesh_type, mesh_mode, num_all_nodes,
num_bound_nodes, rect_size)>
<!-- mesh type and subtypes mode -->
<!ELEMENT mesh_type EMPTY>
<!ATTLIST mesh_type
          mode_type (Triangular|Quadiletral) #REQUIRED>
<!ELEMENT mesh_mode EMPTY>
<!ATTLIST mesh_mode
          mode_info (Uniform|Delaunay) #REQUIRED>
<!-- Number of nodes and boundary nodes-->
<!ELEMENT num_all_nodes EMPTY>
<!ATTLIST num_all_nodes
          num_all CDATA #REQUIRED>
<!ELEMENT num_bound_nodes EMPTY>
<!ATTLIST num_bound_nodes
          num_bound CDATA #REQUIRED>
<!ATTLIST rect_size
          xsize CDATA #REQUIRED
          ysize CDATA #REQUIRED>
<!ELEMENT mesh_geom_field (mesh_geom_coord, code*)>
<!ATTLIST mesh_geom_coord
          xcoord CDATA #REQUIRED
          ycoord CDATA #REQUIRED>
<!ELEMENT mesh_motion (mesh_motion_field, code*)>
<!ATTLIST mesh_motion
          motvecx CDATA #REQUIRED
          motvecy CDATA #REQUIRED>
<!-- Mesh Animation Object Model3D -->
<!ELEMENT MeshAnimObjModel3d (mesh_geom_3d, mesh_motion_3d)>
<!ELEMENT mesh_geom_3d(mesh_geom_info, mesh_geom_field_3d)>
<!ELEMENT mesh_geom_coord_3d (mesh_geom_coord, code*)>
<!ATTLIST mesh_geom_coord_3d
          xcoord CDATA #REQUIRED
          ycoord CDATA #REQUIRED
          zcoord CDATA #REQUIRED>
<!ELEMENT mesh_motion_3d (mesh_motion_field, code*)>
<!ATTLIST mesh_motion_3d
          motvecx CDATA #REQUIRED
          motvecy CDATA #REQUIRED
          motvecz CDATA #REQUIRED>
]>
```

What is claimed is:

1. A method comprising:

in an online mode, downloading audiovisual data;

representing a synthetic feature of the audiovisual data having a defined animation parameter as a descriptor, wherein the descriptor is selected according to a synthetic audiovisual description scheme that specifies a structure and semantics of relationships between components of the audiovisual data;

assigning a value to the descriptor based on the synthetic feature; and at an arbitrary time after the downloading of the audiovisual data, in an offline mode, generating a description based on the value of the descriptor, wherein the description comprises spatial and temporal relationships of audiovisual objects in a scene.

2. The method of claim 1, wherein the components comprise other constituent description schemes.

3. The method of claim 2, wherein the other constituent description schemes comprise an animation event description scheme corresponding to dynamic characteristics of the audiovisual data.

4. The method of claim 2, wherein the constituent description schemes comprise an animation object description scheme corresponding to static characteristics of the audiovisual data in the scene.

5. The method of claim 2, wherein the constituent description schemes comprise an animation event and a relational description scheme.

6. The method of claim 1, wherein the synthetic feature is a model feature used to generate the audiovisual data.

7. The method of claim 6, wherein the model feature comprises one of a two-dimensional model and a three-dimensional model.

8. The method of claim 1, wherein each audiovisual object is associated with synthetic features and an animation stream.

9. The method of claim 8, wherein the synthetic features of an audiovisual object are grouped together as being one of visual, audio, and a relationship of media.

10. The method of claim 1, wherein the value is an instantiation of the descriptor corresponding to the audiovisual data.

11. The method of claim 1, wherein representing, assigning and generating are performed using extensible markup language.

12. The method of claim 1, wherein the synthetic audiovisual description scheme comprises a document type definition that provides a list of example descriptors used during the representing.

13. The method of claim 12, wherein the document type definition specifies a set of rules for a structure of the audiovisual data.

14. The method of claim 1, wherein the description comprises the value and is associated with the synthetic audiovisual description scheme.

15. The method of claim 14, wherein the synthetic audiovisual description scheme is incorporated in the description.

16. The method of claim 14, wherein the synthetic audiovisual description scheme is stored at a remote location and the description is linked to the synthetic audiovisual description scheme.

17. The method of claim 16, wherein a device at the remote location is accessible over a network.

18. The method of claim 1, wherein the synthetic audiovisual description scheme is compatible with MPEG-7.

19. A system comprising:
a processor; and
a computer-readable storage medium having instructions stored which, when executed by the processor, result in the processor performing operations comprising:
in an online mode, downloading audiovisual data;
representing a synthetic feature of the audiovisual data having a defined animation parameter as a descriptor, wherein the descriptor is selected according to a synthetic audiovisual description scheme that specifies a structure and semantics of relationships between components of the audiovisual data;
assigning a value to the descriptor based on the synthetic feature; and
at an arbitrary time after the downloading of the audiovisual data, in an offline mode, generating a description based on the value of the descriptor, wherein the description comprises spatial and temporal relationships of audiovisual objects in a scene.

20. The system of claim 19, wherein the components comprise other constituent description schemes.

21. The system of claim 20, wherein the constituent description schemes comprise the synthetic animation event description scheme corresponding to dynamic characteristics of the audiovisual data.

22. The system of claim 21, wherein the synthetic audiovisual description scheme comprises a document type definition that provides a list of example descriptors used during the representing.

23. The system of claim 22, wherein the document type definition specifies a set of rules for a structure of the audiovisual data.

24. The system of claim 19, wherein the synthetic feature is a feature of a model used to generate the audiovisual data.

25. The system of claim 24, wherein the model is one of a two-dimensional and a three-dimensional model.

26. The system of claim 25, wherein each audiovisual object is associated with synthetic features and an animation stream.

27. The system of claim 26, wherein audiovisual object features are grouped together as being one of visual, audio, a relationship on semantic, and a relationship on media.

28. The system of claim 19, wherein the value is an instantiation of the descriptor corresponding to the audiovisual data.

29. A computer readable storage device having instructions stored which, when executed by a computing device, cause the computing device to perform operations comprising:
in an online mode, downloading audiovisual data;
representing a synthetic feature of the audiovisual data having a defined animation parameter as a descriptor, wherein the descriptor is selected according to a synthetic audiovisual description scheme that specifies a structure and semantics of relationships between components of the audiovisual data;
assigning a value to the descriptor based on the synthetic feature; and
at an arbitrary time after the downloading of the audiovisual data, in an offline mode, generating a description based on the value of the descriptor, wherein the description comprises spatial and temporal relationships of audiovisual objects in a scene.

30. The computer readable device of claim 29, wherein the components comprise other constituent description schemes.

* * * * *